United States Patent [19]
McSparran

[11] 3,878,400
[45] Apr. 15, 1975

[54] EXCITATION CONTROL ARRANGEMENT FOR DIESEL-ELECTRIC PROPULSION SYSTEMS

[75] Inventor: Lloyd Wilfred McSparran, Erie, Pa.
[73] Assignee: General Electric Company, Erie, Pa.
[22] Filed: Apr. 30, 1973
[21] Appl. No.: 355,800

[52] U.S. Cl. ...................... 290/14; 290/17; 290/40; 60/39.28; 322/23
[51] Int. Cl. ............................................. B60l 11/02
[58] Field of Search ......... 290/14, 17, 40; 60/39.28; 322/23, 24, 25

[56] References Cited
UNITED STATES PATENTS

| | | | |
|---|---|---|---|
| 2,546,023 | 3/1951 | Stamm | 290/17 X |
| 2,658,152 | 11/1953 | Brancke | 290/17 X |
| 2,683,817 | 7/1954 | Kolhoff | 290/40 |
| 3,263,142 | 7/1966 | Adoutte et al. | 290/14 X |
| 3,340,883 | 9/1967 | Peternel | 290/40 R |
| 3,520,133 | 7/1970 | Loft et al. | 60/39.28 X |
| 3,621,370 | 11/1971 | Vandervort | 322/23 |

*Primary Examiner*—Donovan F. Duggan
*Attorney, Agent, or Firm*—W. C. Bernkopf

[57] ABSTRACT

An improved load control system adapted for turbocharged dieselelectric locomotives wherein engine exhaust gasses drive the turbocharger. A power reference signal, corresponding to desired power output for the throttle setting, and a turbo speed signal, corresponding to a function of the actual rotational speed of the turbocharger rotor, are generated. The lower valued one of these signals is selected and compared with an actual power output signal, derived by multiplying signals representative of the output voltage and current of electric generating means driven by the diesel engine, so as to derive an error signal for modifying excitation of the generating means. Additional circuitry provides for reducing output of the generating means in the event the turbo rotor speed or the engine temperature exceed rated limits, and for limiting the output voltage and output current of the generating means to desired magnitudes.

7 Claims, 3 Drawing Figures

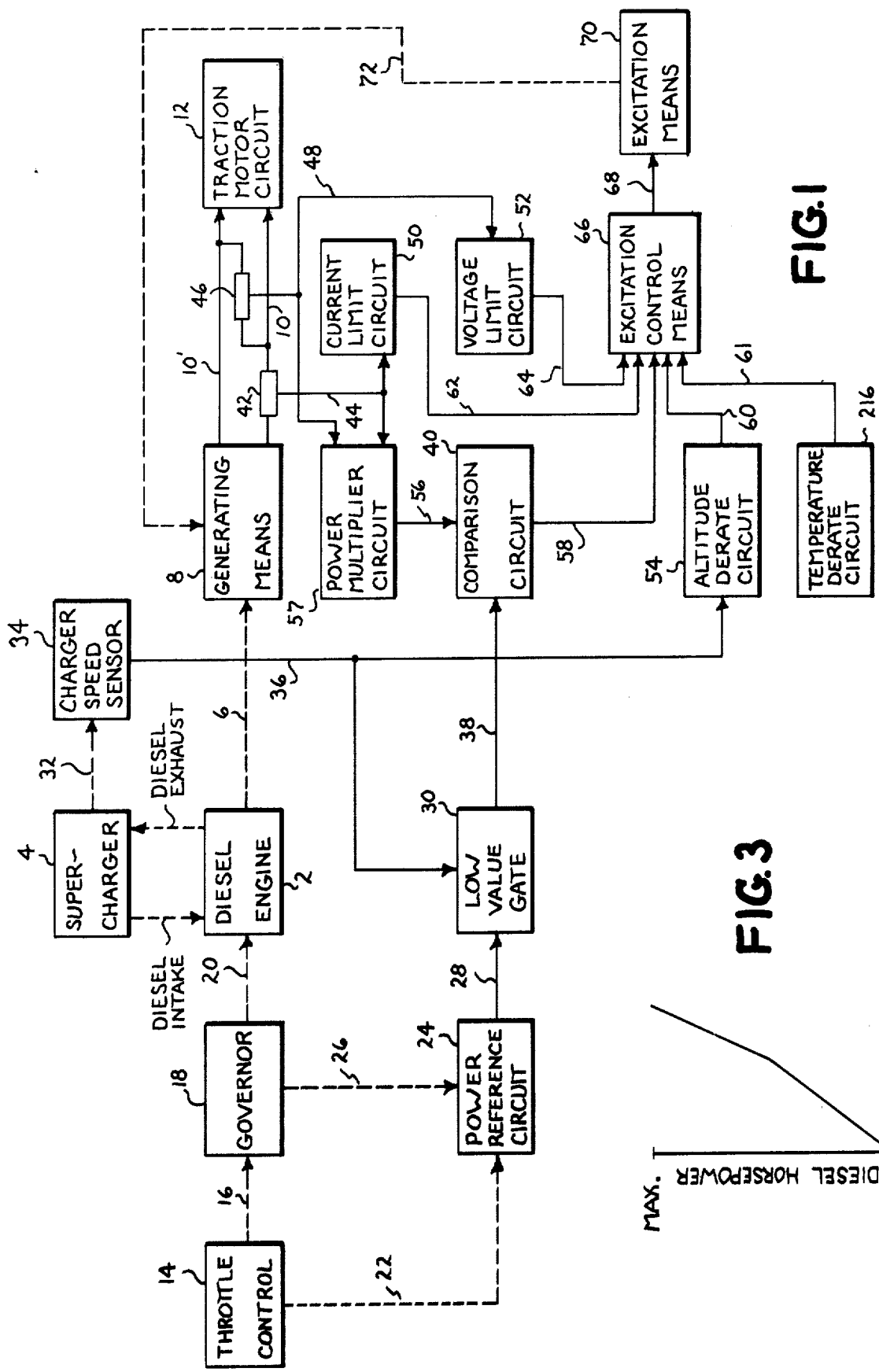

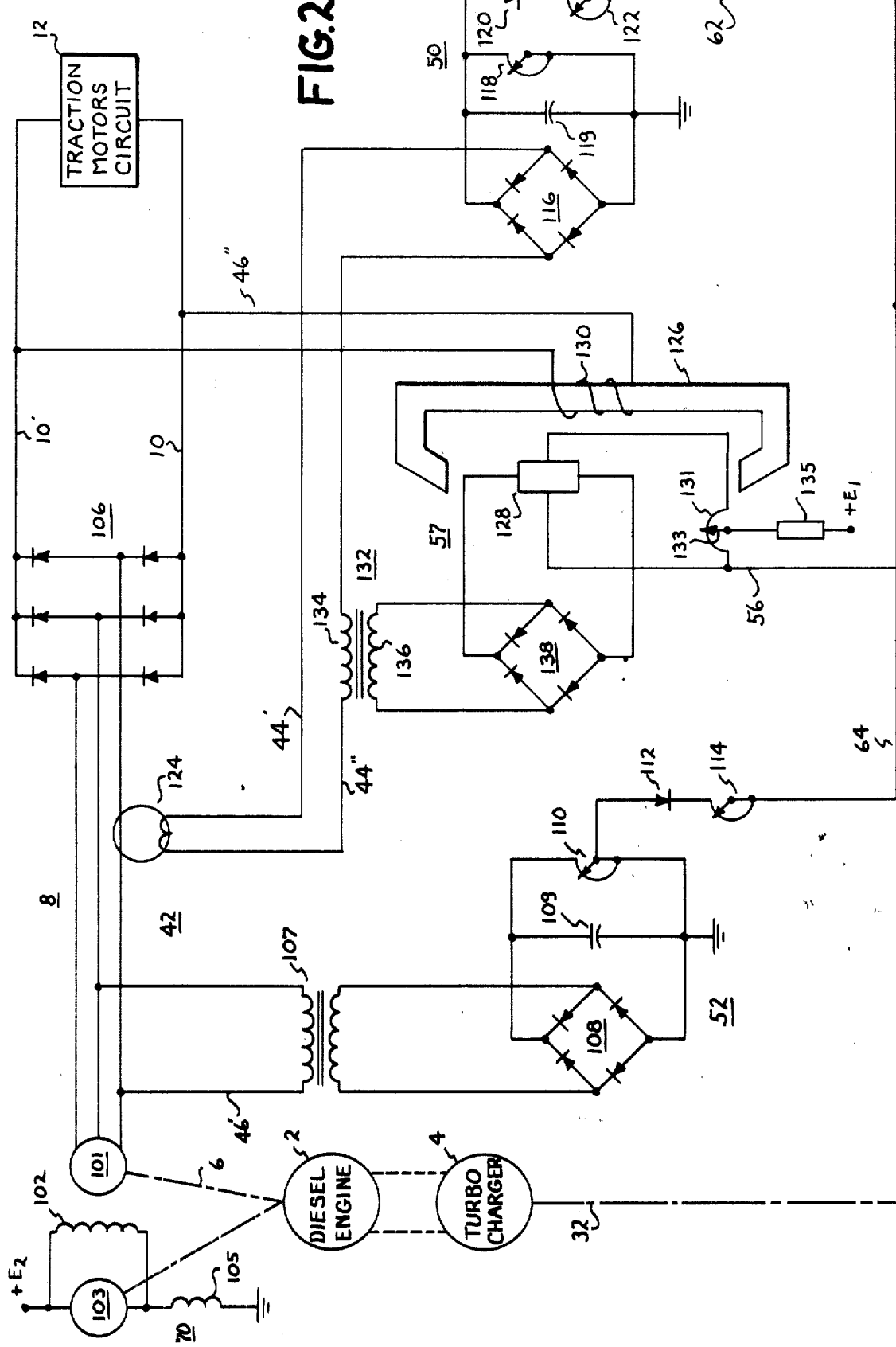

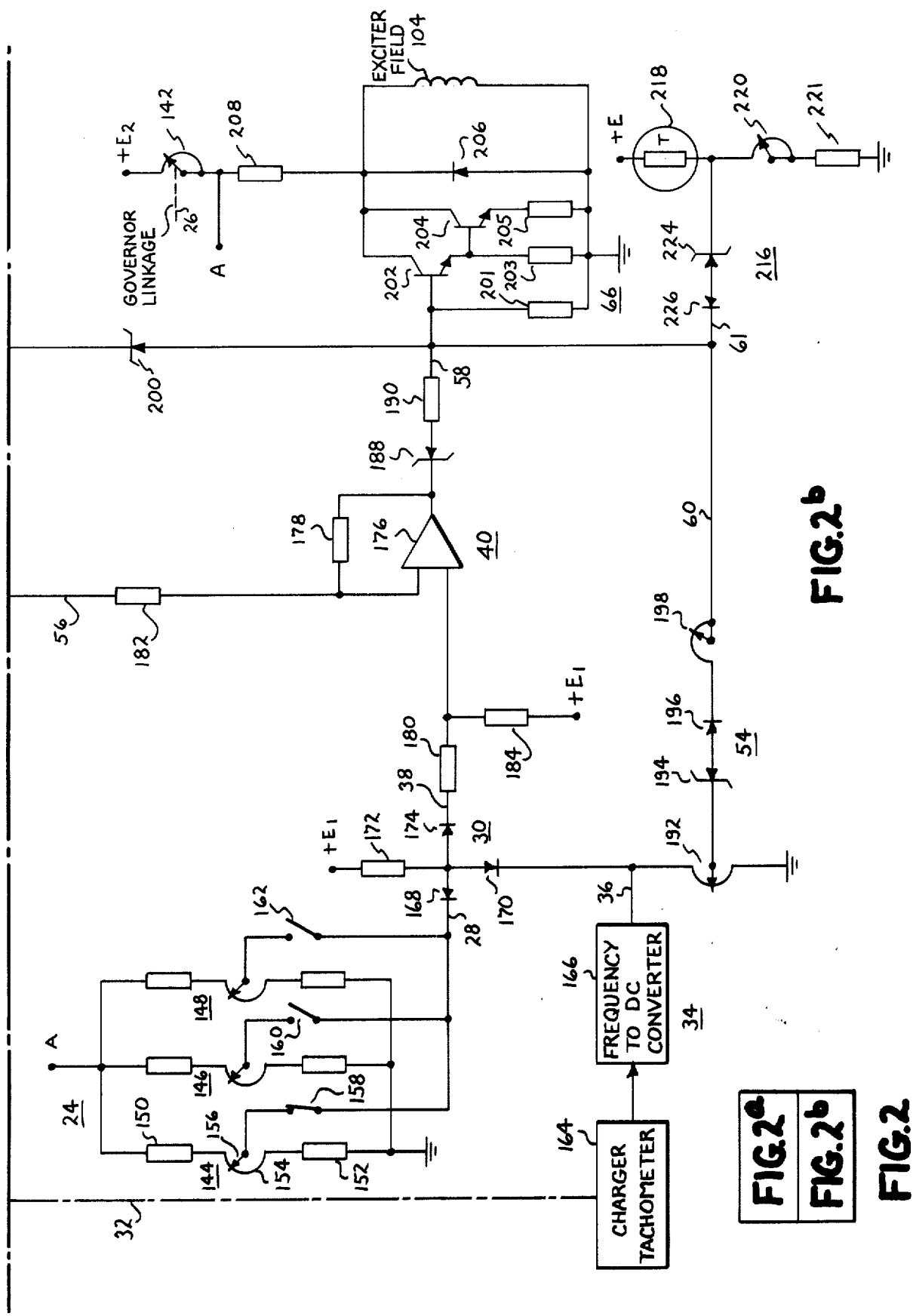

EXCITATION CONTROL ARRANGEMENT FOR DIESEL-ELECTRIC PROPULSION SYSTEMS

BACKGROUND OF THE INVENTION

Traction vehicle propulsion systems commonly use a diesel engine prime mover to drive electrical generating means for providing power to the traction motors. For example in diesel electric locomotives the diesel engine drives a generator, or an alternator, whose output is rectified, so as to provide electric power to d-c traction motors.

Diesel engine operation includes piston compression of fresh air admitted into cylinders, injection of fuel which is ignited by the resulting high air temperatures, and movement of the pistons and crankshaft caused by the expanding gases. Satisfactory operation required effective ejection of the exhaust gases and their replacement by fresh air. Power output of an engine can be increased by injecting pressurized fresh air so as to increase the amount of fuel burned in the engine cylinders. This pressurized air is commonly supplied by superchargers associated with the diesel in order to increase the available peak horsepower of the engine. It is desirable to utilize centrifugal superchargers which are turbine driven from the diesel engine exhaust gases, and are therefore referred to as turbochargers. Turbochargers generally permit attainment of maximum engine output and, additionally, permit engines operated at high altitudes to be operated nearly at their sea-level ratings.

Diesel engines employed for traction applications generally develope constant available horsepower for a given diesel engine speed. The diesel engine speed, and thus available horsepower, may be varied, such as by stepped movements of a control member. Since the diesel engine speed is a function of applied fuel, a governor fuel control system is conventionally utilized to maintain predetermined engine speeds. Additionally the actual horsepower output of the diesel engine and of the generating means and thus the tractive effort is maintained at desired levels by controlling the diesel engine load. This is conventionally accomplished by adjustment of the exciting field of the generating means. Propulsion control systems of this type are disclosed in U.S. Pat. Nos. 2,886,763 and 3,105,186, which are assigned to the assignee of this application.

Diesel electric propulsion systems of this type generally provide satisfactory operation. However, deficiencies described below may result under some operational conditions as a result of improper operation of the turbocharger.

During transient load and speed changes, the available engine horsepower and the power demand or generator load may be rapidly varied so as to result in an undesirable generation of engine smoke. The phenomena generally occurs during vehicle acceleration and is believed to result from a sudden application of fuel to the engine. This upsets the proper air to fuel relationship, required for efficient diesel engine combustion and minimum smoke, until the diesel engine turbocharger provides sufficient air.

Governor fuel control systems incorporate an absolute air manifold pressure bias load control and fuel limiter device. The fuel limiter is intended to reduce fuel application during transient load and speed changes so as to reduce excessive engine smoking until sufficient air is supplied to the engine. However, operation of the device is slow such that substantial transient smoke can occur before control is effected. Additionally, adjustment of the complex system precludes effective smoke suppression over the entire horsepower, i.e., throttle, range.

In order to further suppress smoking, open-loop time delay or rate control circuits have been incorporated into the load control system. Such an arrangement is disclosed in U.S. Pat. No. 3,621,370 - Vandervort. Smoke reduction is therein obtained by delaying the application of full load to the diesel engine for a short time period subsequent to an increase of throttle setting or diesel engine output power. However, under some circumstances such arrangements may not be entirely effective. For example, the resultant time delay in applying the required traction motor current may inhibit train handling at very low speeds. Some smoking or engine bogging might also occur during a brief time interval after the throttle level setting is rapidly increased.

During high altitude operation of vehicles, the turbocharger may attain excessive speeds. The decreased density of ambient air at high altitudes offers less resistance to the turbocharger, so that an arrangement is required to prevent destructively high turbocharger speeds. Barometric pressure sensing arrangements previously utilized to obtain altitude compensation have not been entirely successful.

Additionally, under some circumstances, the air supplied to the engine air intake manifold may have inadequate pressure so as to result in inadequate combustion air. The above-referenced governor load control is activated when manifold air pressure has been reduced below a predetermined level in order to avoid overheating the engine. However, the sensing and mechanical control arrangements utilized limit the effectiveness of the system to some degree.

It is an object of this invention to provide an improved excitation control system for diesel engine driven electric propulsion systems.

Another object is to provide such a control system to provide improved smoke control.

It is a further object to provide an improved control arrangement for precluding improper high altitude operation of diesel engine turbochargers.

It is yet a further object to provide a control system which provides for reduction in diesel engine load in response to improper engine performance characteristics, such as excess engine temperature.

It is an additional object to provide a simplified excitation control system permitting propulsion system operation at any of a number of predetermined horsepower output levels.

SUMMARY OF THE INVENTION

Briefly, stated, the invention is practiced by generating a power reference signal, representative of desired horsepower output of the generating means, and a turbosignal, representative of the rotational speed of the rotor of the diesel engine turbocharger. The lower valued one of these signals is compared with a power output signal, representative of the actual power output of the generating means, to produce an excitation error signal, required to attain a predetermined horsepower output adequately which, however, is limited while turbocharger air output is increasing to required quantities. In accordance to another aspect of the invention means are provided for modifying the excitation error signal in the event the turbocharger signal exceeds predetermined limits, so as to prevent excessive turbocharger rotor speeds which may otherwise occur at high altitudes.

Additional means may be provided to modify the excitation error signal in response to generator output currents, generator output voltage, or engine temperatures in excess of predetermined limits.

The novel and distinctive features of the invention are set forth in the appended claims. The invention itself, together with further objects and advantages thereof, may be understood by reference to the following description and accompanying drawings.

BRIEF DESCRIPTION OF THE DRAWINGS

FIG. 1 is a simplified block diagram illustration of a traction propulsion system incorporating the control system of this invention.

FIG. 2 is a simplified schematic circuit diagram of the control system in accordance with one embodiment of this invention.

FIG. 3 is a graphic illustration of a representative relationship of turbocharger speed in respect to diesel engine horsepower.

DESCRIPTION OF THE PREFERRED EMBODIMENT

Reference is directed to FIG. 1. A diesel engine prime mover 2 has its output shaft 6 coupled to drive rotary electrical generating means 8 whose electrical output is coupled by lines 10 and 10' to the traction motor circuit 12. The diesel engine speed, and thus its available horsepower, is controlled by a governor 18. The engine speed may be adjusted at desired levels, such as for example, by the throttle control lever 14. The engine governor system, which does not form a part of this invention may be a mechanical or fluid amplifier whose output determines the fuel applied to the engine. For example, electro-hydraulic engine control governors are commonly utilized which maintain constant engine speed regardless of changing conditions of load for any speed setting. For example, the governor output may control the displacement of the fuel control rack which rotates the plunger in the fuel pump so as to meter the fuel supplied to the engine's cylinders. A fuel rack displacement may be responsive to the difference between the predetermined reference speed, as set by the engine throttle lever, and a feedback mechanical speed and link coupled to the governor. In FIG. 1, line 16 represents the coupling between the throttle control and the governor and line 20 represents the governor output controlling the fuel flow in the diesel engine. A supercharger 4 is associated with the diesel engine. This may be a self contained unit consisting of a gas turbine and a centrifugal blower with a turbine wheel and air impeller mounted at opposite ends of a common shaft so as to make up a rotor assembly. In conventional type of superchargers the engine exhaust gases are discharged into the gas turbine at the exhaust end of the rotor, the turbocharger commonly being mounted at the free end of the diesel engine with its exhaust engine casing aligned with the diesel engine exhaust manifold. Diesel engine intake air is compressed by the impeller and is directed to the diesel engine intake manifold by means of air discharge openings. The charger speed sensor 34 produces an electrical signal on line 36 which corresponds to the rotational speed of the turbocharger rotor. Dashed line 32 represents the coupling between the rotor and the charger speed sensor. Rotational speed of the turbocharger rotor may be sensed by an electro-magnetic mechanism. For example, magnets may be mounted on the rotor shaft, and the rotor speed sensor may incorporate a coil located in close proximity to the magnets on the rotor shaft such that electrical pulse energy signals are produced in the output leads of the coil. Rotation speed sensing systems of this type are known in the art being diclosed, for example, in U.S. Pat. No. 3,077,549 - Zelina, assigned to the assignee of this application.

The power output of the electrical generating means is controlled to prevent excessive voltages and currents and additionally to prevent the power output of the traction generating means from exceeding the available power output of the diesel engine. The output of the electrical generating means is thus controlled by a high gain feedback system which maintains the electrical power output of the generating means at a predetermined magnitude. Conventionally the generating means incorporates an excitation generator whose exciting field is controlled by the feedback network. For this purpose, FIG. 1 illustrates excitation means 70 whose output 72 is coupled to the generating means 8.

A load sensing arrangement senses the output voltage and output current of the generating means. Current sensor 42 is coupled by line 44 to power reference circuit 57 and current limit circuit 50, and a voltage sensor 46 is couled by line 48 to the power multiplier circuit and to a voltage limit circuit 52. The current limit circuit and the voltage limit circuit provide outputs, respectively, on lines 62 and 64, to excitation control means 66 which is coupled by line 68 to excitation means 70. In the event the output of the generating means has an excessive current the signal on line 62 will cause a reduction in excitation of the generating means so as to properly reduce the output current. Similarly an excess voltage output will cause a reduction in excitation to reduce the output voltage.

The power output of the generating means is controlled by comparing the desired power output with actual power output. In prior load control systems, such as those disclosed in the reference Zelina patent, complex arrangements were used to modify a reference current with a function of generator output voltage or current. The preferred embodiment, however, is simplified by using voltage comparison arrangement. The voltage and current signals on lines 44 and 48, respectively, are applied to power multiplier circuit 57 whose output, on line 56, is a function of the product of the sensed voltage and current signals, and thus represents the actual power output of the generator 8. A power reference circuit 24 produces a voltage output representative of the desired generating means power output. This output is applied by line 28 to low value gate 30 whose output is coupled by line 38 to comparison circuit 40. The comparison circuit compares the signal on line 56, representative of actual power, with the signal on line 38, representative of desired power to produce on line 58 a signal representative of power error. Line 58 is coupled to the input of excitation control means 66, such that the power error signal appropriately modified the excitation of the generating means 8. The output of the power reference circuit is modified in accordance to the predetermined desired output power of the generating means. Thus throttle control 14 is coupled by line 22 to the power reference circuit, such that in each throttle notch the power reference circuit output voltage is adjusted to a suitable level. The described load control arrangement, therefore, provides a constant kilowatt power output from the generating means for any predetermined throttle control setting. Some governor systems provide partial load control by modifying the exciter field excitation as a function of generator load. Where such systems are utilized, it is necessary to modify the power reference signal as a function of the excitation control applied by the governor. For ths purpose line 26 is connected from governor 18 to the power reference circuit 24.

In the above-described arrangement, the magnitude of the power reference circuit output signal, on line 28, continuously corresponds to the desired power output of the power output generating means 8 and the magnitude of the power multiplier output on line 56 continuously corresponds to the actual power output of the generating means. The load control error signal supplied on line 58 therefore instantly controls the power demand of the traction generating means in response to the desired horsepower output. Accordingly when the throttle setting is increased and the available diesel engine output is increased, the power demand of the generating means increases prior to the time that adequate air is provided by the turbocharger for efficient combustion. This may result in an unbalanced fuel to air supply and the generation of smoke. Accordingly, an additional arrangement is provided for retarding increase in output power of the generating means until the turbocharger speed has increased so as to provide a proper fuel to air mixture. The turbocharger output and the turbocharger rotor speed have a predetermined relationship to the diesel engine available horsepower. For the diesel engine-turbocharger system utilized in the preferred embodiment, the turbo rotor speed increases substantially linearly with increases in available diesel engine horsepower, as illustrated in FIG. 3. Thus the rotational speed of the turbo rotor can be used as an indication of whether the turbocharger output has attained the magnitude necessary for operation at any specified horsepower setting. The turbocharger speed signal, on line 36, is coupled to one input of low value gate 30. The low value gate provides as its output, on line 38, a signal representative of the lower value of the power reference circuit signal or the turbocharger speed sensor signal. The input signals to the low value gate are scaled such that the turbocharger speed signal has a higher magnitude than the power reference circuit signal when the turbocharger has attained its rated output. The described arrangement thus establishes a temporary ceiling on diesel engine loading so as to inhibit the exhaust smoke density during locomotive engine acceleration.

The turbocharger speed signal, line 36, is additionally connected to the input of altitude derate circuit 54 whose output 60 is applied to the excitation control means 66. An altitude derate circuit provides an output on line 60 when the turbo speed approaches its maximum allowable value, as may occur at high power under high altitude conditions, or it may possibly occur under abnormal conditions affecting the engine and the turbocharger. The signal on line 60 causes a reduction in diesel engine loading prior to the turbo speed approaching its maximum allowable value such that turbo overspeed produces a direct signal providing for power demand reduction.

Similarly, it may be desirable to reduce power demand in the event of engine overheating. Temperature derate circuit 216 is provided for this purpose. This circuit provides an output signal to the excitation control means 66 responsive to an engine overheating.

Reference is now made to FIG. 2 which in simplified schematic form illustrates an embodiment of the load control circuit. The electrical generating means 8 comprises an alternator whose output is rectified and which is excited by a d-c exciter. The alternator is preferably of the revolving field type having its field winding 102 connected in series circuit with armature 103 of the exciter. The stator windings 101 provide multi-phase a-c outputs to the rectifier circuit 106 whose output is coupled by lines 10 and 10' to the traction motor circuit 12. Diesel engine means 2 is rotatably coupled to the alternator and to the armature of the d-c excitation means as schematically indicated by dashed lines 6. The electrical output of the electrical generating means 8 is modified by varying the excitation field of the d-c exciting generator. A separator exciter field winding 104 is provided for this purpose, and is illustrated in FIG. 2B as being connected to the output of excitation control means 66. A series field winding 105 may be connected in series with the voltage source and the exciter armature in order to crank, i.e. start the diesel engine.

REFERENCE SIGNAL CIRCUITS

The power reference circuit 24 provides a voltage signal output on line 28 to the low value gate 30, which output is representative of the desired power output of the generating means. The preferred embodiment has a throttle control which can be set to a number of discrete "notch" positions and the power reference circuit provides a different predetermined voltage output for each throttle notch setting. A voltage divider network is provided for each available throttle notch setting and the outputs of these voltage dividers are coupled through contactor switches to line 28. Different ones of the contactors are closed in response to the position of the throttle handle. The individual voltage divider networks are connected in parallel between terminal A and common. The three voltage reference networks, 144, 146, and 148, have their outputs connected respectively through terminals 158, 160 and 162 to the output line 28. Contactor 158 is shown closed and the others are open. Voltage reference network 144 comprises resistors 150, 152 connected on opposing sides of potentiometer 154 whose arm 156 is connected to a terminal of contactor 158. In the preferred embodiment the governor system exerts some load control. As illustrated on the right side of FIG. 2B, a linkage from the governor, 26, moves the wiper arms of a governor load control potentiometer 142 which is connected between a source of positive potential $E_2$ and the junction of terminal A and resistor 208. Terminal A of the power reference circuit is connected to the junction of the load control potentiometer and resistor 108 as indicated.

The turbocharger speed sensor 34 includes a tachometer 164 coupled, as indicated by line 32, to the turbocharger 4 so that the tachometer output comprises pulses occurring at a rate proportional to rotor speed. Frequency to d-c converter 166 converts the pulse signals to a direct current signal having an amplitude proportional to the rotor. This signal appearing on line 36 and the power reference circuits signal, on line 28, are coupled to low value gate 30. A control circuit may be serially connected into line 28 so as to limit the rate at which the reference voltage is modified upon switching the throttle lever from one notch to the other. This may, for example, comprise a serially connected current limiting diode, and a shunt capacitor. When the throttle setting is changed the rate at which the capacitor charges is thus controlled. In addition an operational amplifier, or other type of buffer, may be inserted intermediate to the power reference circuit and the low value gate. In some engine-turbo supercharger systems, the turbo speed does not vary linearly with the diesel horsepower throughout the entire operating range. Instead, the turbo speed may vary linearly at a first slope through the first throttle range and then vary substantially linearly at a second slope through the remaining throttle range, as illustrated in FIG. 3. Accordingly, it may be desirable to modify turbo speed reference voltage signal appearing on line 36 in order to compensate for this. For example, a two slope turbo speed vs. turbo speed reference voltage signal relationship may be obtained by including a signal modifying circuit into the frequency to d-c converter 166. This may comprise an operational amplifier having an additional parallel feedback circuit comprising a resistor and a zener diode which breaks down when the turbo speed signal exceeds the potential at which the signal slope is to be altered.

The low value gate 30 comprises three diodes, 168, 170 and 174, having their anodes commonly connected to one terminal of resistor 172 whose other terminal is connected to a source of positive potential. The cathodes of diodes 168 and 170 are connected, respectively, to lines 28 and 170 and the cathode of diode 174 is connected by line 38 to the input of comparison circuit 40. The voltage on line 38 corresponds to that signal appearing on lines 28 and 36 having the lowest magnitude. Low value gates of this type are well known in the art, being disclosed, for example, in U.S. Pat. No. 3,520,133 which is assigned to the assignee of this invention.

POWER FEEDBACK CIRCUIT

The output current of the generating means is sensed by current sensor 42 which in preferred embodiment comprises a current transformer coupled to one of the multi-phase output windings of the alternator. However, the current sensor could, of course, be incorporated into the output lines 10 and 10' of the rectifier circuit 106 if an appropriate sensing device is utilized for sensing a d-c, as opposed to an a-c, signal. Output winding 124 of the current transformer is connected by lines 44' and 44'' to bridge rectifier 116 in current limit circuit 50. Transformer winding 132 couples the current signal to power multiplier circuit 57. The primary winding 134 of this transformer is shown connected in series circuit with line 44' and the secondary winding 136 is connected to bridge rectifier 138. Transformer 132 provides isolation from the current limit circuit which is subsequently described. It may be desirable to incorporate suitable filtering means into the current sensor line 44' or 44''. The illustrated embodiment of the power multiplier circuit comprises a Hall effect multiplier. A rectified current signal is applied from rectifier bridge 138 to two terminals of the Hall effect multiplier crystal. A voltage winding 130 on core 126 of the Hall effect device is coupled by lines 46'' to output line 10 and 10' of the electrical generating means, such that the output voltage of the generating means is impressed on coil 130. The output terminals of the Hall effect crystal are serially connected across adjustment potentiometer 131 whose arm 133 is serially connected through potentiometer 135 to a source of positive potential. Thus the voltage signal on line 56 connected to one of the output terminals of the Hall effect crystal is a function of the current and voltage signals applied to the multiplier. An operational amplifier may be inserted into line 56 in order to appropriately amplify the multiplier output signal and a lead network may be inserted into the Hall effect crystal potentiometer 131 circuit in order to improve the stability of the excitation system and to further reduce engine smoking. Output of the multiplifier may be suitably calibrated by adjustment of arm 133 of the potentiometer.

COMPARISON CIRCUIT

Lines 56 and 38 are coupled circuit 40 which on line 58 produces an output error signal. The signal on line 56 corresponds to the mutual power output of the generating means whereas the signal on line 38 corresponds to the power reference signal or the turbo speed signal, depending as to which has the lower voltage magnitude. Circuit 40 is a differential input amplifier comprising an operational amplifier 176, feedback resistor 178, a first input resistor 182 connected serially between line 56 and the junction of resistor 178 and one input terminal of the operational amplifier, and a second input resistor 180 coupled from line 38 to a second input of the operational amplifier. Resistor 184 is connected between a source of potential and the junction of resistor 180 and the input to the operational amplifier 176. Differential input amplifiers of this type are well known in the art and they provide an output signal which corresponds to the difference of the two input voltages multiplified by a constant which is a function of the resistance values of the resistors in the circuit. Zener diode 188 and resistor 190 are connected in series circuit between the output of operational amplifier 176 and the input of excitation control means 66. The zener diode may be utilized to properly offset the voltage magnitude of the output signal of the differential amplifier. Resistor 190 translates the voltage signal into an appropriate current signal.

VOLTAGE AND CURRENT LIMIT CIRCUITS

Two of the output lines of the alternator are coupled by lines 46' to the primary of transformer 107 whose output is connected to bridge rectifier 108. The output terminals of the bridge rectifier are connected to potentiometer 110 whose wiper arm is connected in series circuit to isolating diode 112 and adjustment potentiometer 114 to line 64. Filter capacitor 109 is connected in parallel with potentiometer 110. Line 64 is serially connected by zener diode 200 to the input of excitation means 66. Thus when the potential on the wiper arm of potentiometer 110 exceeds a preset level, conduction takes place through diode 112, potentiometer 114 and zener diode 200 so as to cause a reduction of excitation.

In the current limit circuit 50, output winding 124 of the current transformer is connected to the input of bridge rectifier 116. Potentiometer 118 is connected across the output of bridge rectifier 116, and filter capacitor 119 is connected in parallel therewith. The junction of capacitor 119 and potentiometer 118 is connected in series circuit with diode 120, potentiometer 122, line 62 and zener diode 200 to the input of excitation control means 66. Thus when the voltage across potentiometer 118 exceeds a predetermined level conduction takes place through devices 120, 122 and 200 so as to reduce excitation.

ALTITUDE DERATION

The altitude deration circuit 54 provides for a reduction in excitation when the turbo rotor speed approaches excessive rotation speed. A turbo rotor speed signal is applied from line 36 across potentiometer 192, and the arm output of the potentiometer is serially connected through zener diode 194, diode 196, and potentiometer 198 to line 60 which is connected to the input of excitation control means 66. Adjustment of potentiometer 192 in combination with the breakdown value of the zener diode determines the level at which conduction takes place. Diode 196 is poled so as to isolate the turbo speed signal circuit from being affected by other currents which are applied to the excitation control means.

TEMPERATURE DERATION

The temperature derate circuit 216 reduces excitation when the temperature in the diesel engine exceeds a predetermined limit. The circuit includes a voltage divider network comprising temperature responsive resistor 218, potentiometer 220 and resistor 221. This voltage divider is connected between a source of positive potential and common. Zener diode 224, diode 226, and temperature derate output line 61 are serially connected from the junction of resistors 218 and 220 to the input of the excitation control means 66. The temperature responsive resistor 218 may be fixed in the exhaust manifold of the diesel engine so as to sense the exhaust manifold temperature. Alternatively, temperature responsive resistor having a limited upper temperature range may instead be inserted into the inlet manifold. When the manifold temperature exceeds a predetermined temperature conduction takes place through zener diode 224, diode 226 and line 61 so as lto reduce excitation. The appropriate conduction level may be adjusted by potentiometer 220.

EXCITATION CONTROL MEANS

The excitation control means 66 modified the excitation of the alternator in the electrical generating means system by controlling the current through the exciter field 104. In the preferred embodiment, the exciter control means comprises a circuit connected in shunt with the exciter field 104. However, the excitation control means could alternatively be connected in series circuit with the exciter field 104. In the embodiment illustrated in FIG. 2, the exciter field is in a series circuit connected between a source of positive potential and common. The series circuit includes locomotive control potentiometer 142, resistor 208 and the exciter field 104. The position of the wiper arm on potentiometer 152 is varied by the governor system so as to reduce load demand if diesel engine power is insufficient to sustain full load at the called for diesel engine speed. In such event the governor, by means of linkage 26, moves the wiper arm of load control potentiometer 142 so as to increase the series resistance of the potentiometer and to thus decrease the current to the exciter field 104. Governor load control is not required, and the excitation control system may be designed to operate without load control potentiometer 142. Flyback diode 206 is connected in parallel with exciter field 104.

Transistors 202 and 204 are connected in Darlington configuration in parallel with the serially connected exciter field 104. Inputs to the excitation control means 66 are applied to the base of transistor 202. Resistor 201 is connected from base to common and resistor 203 is connected from emitter to common. The emitter of transistor 202 is connected to base of transistor 204 whose emitter is connected through resistor 205 to common. The collectors of the transistors are both connected to the junction of the exciter field 104 and resistor 208. As previously explained, a power error signal is supplied by line 58 to the excitation control means. In addition the current limit circuit signal on line 62 and the voltage limit circuit signal on line 64 are applied through zener diode 200 to the input of the excitation control means. In addition, altitude derate circuit signals on line 60 and temperature derate circuit signals on line 61 are also applied to the input of the excitation control means. Thus transistors 202 and 204 conduct in response to the applied signals and divert current. Accordingly, the transistors are equivalent to a variable impedance shunt across the exciter field and exciter field current is decrease in an inverse relationship to the magnitude of the signals applied to the base of transistor 202.

The invention may be utilized with different types of circuitry. For example, the load control circuit may utilize different types of voltage and current sensors and other forms of multiplying circuits. The voltage and current limit circuits may be arranged so as to provide for different predetermined limits for various throttle settings. For example, the sensed voltage and current signals may be compared, respectively, with reference signals derived from circuits similar to the power reference circuit.

Various changes, modifications, and substitutions may be made in the embodiment described herein without departing from the true scope and spirit of the invention as defined in the appended claims.

What I claim as new and desire to secure by Letters Patent of the United states is:

1. In a diesel engine propulsion system for traction vehicle wherein a supercharged diesel engine drives rotating electrical generating means providing an electrical output to traction motors and the rotor of a centifugal turbocharger is driven by diesel exhaust gases to provide pressurized air to the diesel engine, the combination comprising:
   a. first reference means for generating a power reference signal indicative of the preselected power output of said generating means;
   b. turbo signal means for producing a rotor speed signal varying as a function of turbo supercharger rotor speed;
   c. gating means connected to said reference means and turbo signal means to provide a gate output signal representative of the smaller one of said power reference and rotor speed signals;
   d. power signal means to produce a power output signal varying as a function of the actual power output of said generating means;

e. summing means connected to algebraically combined said power output and gate output signals to produce a load control signal, and f. load control means for applying said load control signals to modify the power output of said generating means.

2. The combination of claim 1, wherein said power signal means comprises means for producing a first signal indicative of generating means output voltage and a second signal indicative of generating means output current and means for multiplying said first and second signals to produce a power output signal reprsentative of generating means output power.

3. The combination of claim 2 comprising voltage and current limit means responsive to said first and second signals to produce limit signals indicative of excessive output voltage or output current of said generating means, and means coupling said limit signals to said load control mens to limit the voltage and current output of said generating means to predetermined limits.

4. The combination of claim 3, comprising throttle control means to selectively and incrementally vary the power output of said generating means, said first reference means comprising voltage divider circuitry connected to provide a power reference signal having a voltage amplitude indicative of the preselected power output of said generating means.

5. The combination of claim 2 comprising means for additionally coupling said turbo rotor speed signal to said load control means so that the output of said generating means is reduced upon the turbo rotor exceeding a predetermined rotational speed.

6. The combination of claim 2 comprising means for modifying the magnitude of the turbo signal applied to said gating means as a function of rotor speed so that said turbo speed reference signal vs. rotor speed characteristic matches the engine horsepower vs. steady state turbo speed characteristic of the diesel engine-charger system.

7. The combination of claim 2 comprising means for sensing diesel engine temperature, and means for coupling a signal indicative of excessive engine temperature to said load control means to reduce the electric power output of said generating means.

* * * * *